UNITED STATES PATENT OFFICE.

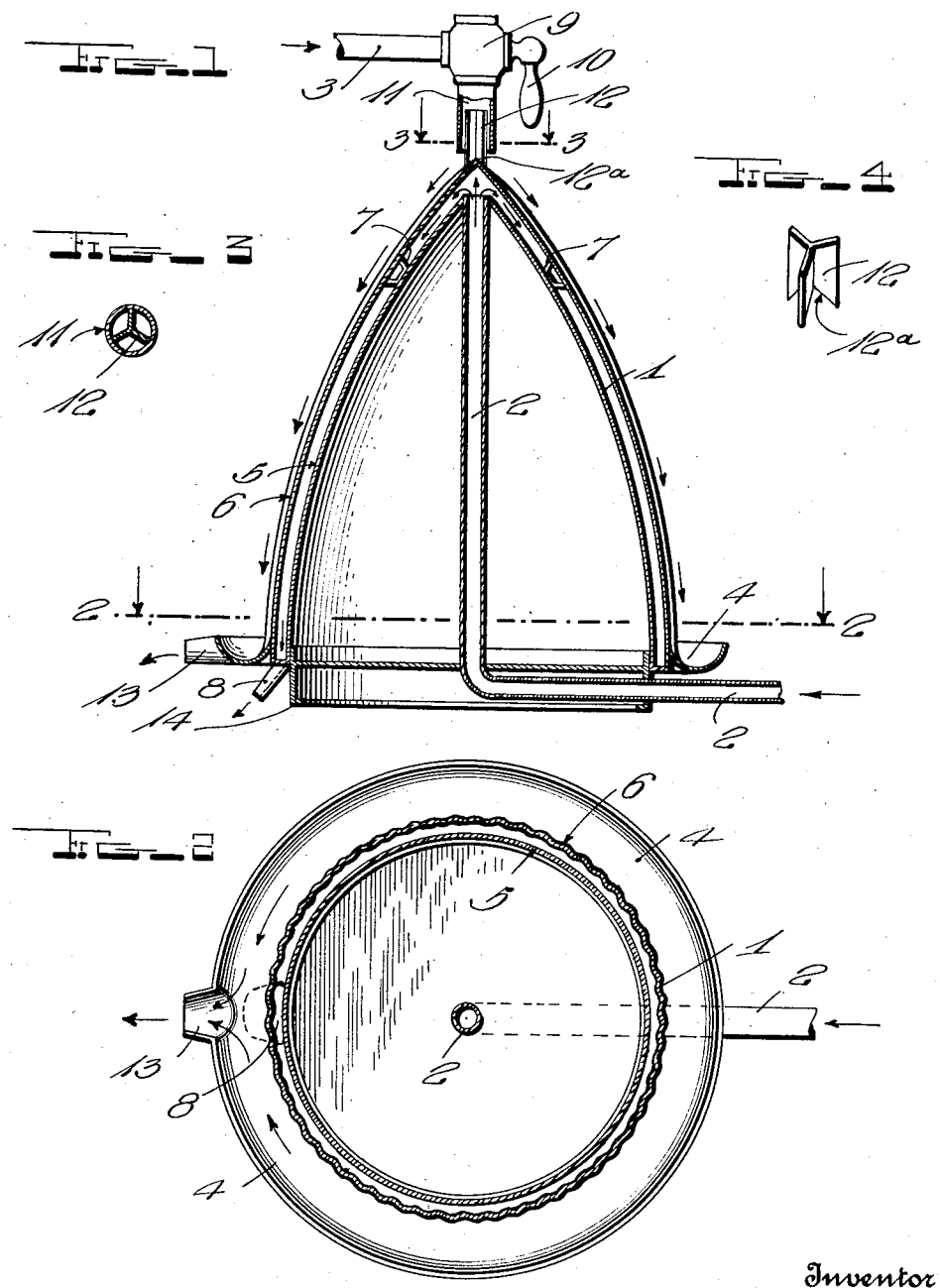

VERA OCKFEN, OF TACOMA, WASHINGTON.

LIQUID-COOLER.

1,355,352. Specification of Letters Patent. Patented Oct. 12, 1920.

Application filed August 11, 1919. Serial No. 316,672.

*To all whom it may concern:*

Be it known that I, VERA OCKFEN, a citizen of the United States, residing at Tacoma, in the county of Pierce and State of Washington, have invented certain new and useful Improvements in Liquid-Coolers; and I do declare the following to be a full, clear, and exact description of the invention, such as will enable others skilled in the art to which it appertains to make and use the same.

This invention relates to improvements in liquid coolers, and it is particularly adapted for cooling milk, although it need not be restricted to such use.

The principal object of the invention is to construct a device of the above mentioned character which is simple and effective, strong, durable, and inexpensive to manufacture.

Other objects and advantages of the invention will be apparent during the course of the following description.

In the accompanying drawings forming a part of this specification and in which like numerals are employed to designate like parts throughout the same, Figure 1 is a vertical sectional view of my improved liquid cooler, some parts being in elevation.

Fig. 2 is a horizontal section on the line 2—2 of Fig. 1.

Fig. 3 is a horizontal section on the line 3—3 of the distributer.

Fig. 4 is a detail perspective view of the distributer.

In carrying out my invention I employ a hollow body, preferably cone-shaped, designated at 1 having spaced walls between which is introduced, by means of a pipe 2, a continuous stream of water or other cooling medium to chill the walls of the cone 1. Above the cone and at its apex I dispose a pipe 3 to supply the liquid to be chilled over the outer surface of the cone 1, thereby cooling the same to the desired point. I also employ an annular trough 4 at the bottom of the cone 1 to catch and deliver the cooled liquid into a suitable receptacle, (not shown).

The cone 1 is preferably constructed with inner and outer walls indicated at 5 and 6 respectively, the outer wall 6 being corrugated as shown. These walls are held apart and prevented from contact with one another by spacers 7 arranged in any desired number around and near the upper portion of the cone 1. The extreme top or apex point of the outer wall 6 is closed, and the inner wall 5 open at its apex to permit the insertion of the pipe 2 therein. The pipe may be soldered or otherwise secured to the inner wall 5, in such a manner as to prevent leakage between the two members. In order that the water or other cooling medium may flow continuously through the pipe 2 and between the walls 5 and 6 of the cone, I provide an outlet 8 at any suitable point at the bottom of the cone 1. The water passing from the outlet 8 may be directed back to the supply pipe 2 or flow into any suitable receptacle, (not shown).

The milk or other liquid to be cooled will be caused to flow through the pipe 3 which is provided at its end with a spigot 9 having the usual handle 10 to regulate the flow of the milk. The mouth or outlet 11 of the spigot is somewhat elongated to allow a distributer 12 to be inserted therein. The distributer is preferably formed with three wings or blades so as to provide three separate passageways for the milk, thus enabling the milk to spread more evenly over the corrugated outer wall of the cone 1. The distributer 12 and the neck 11 are of the same diameter and when the distributer is forced into the neck it will fit snugly therein. When using the apparatus the apex point of the cone 1 must be in perfect alinement with the mouth of the spigot 11 in order to insure the efficient working of the apparatus. I therefore form a concavity $12^a$ in the lower end of the distributer so that it will snugly fit over the apex of the cone and keep the two members in perfect alinement to insure perfect working of the parts. This concavity is formed by inclining the lower edge of each blade upwardly and inwardly from its outer edge toward its inner edge.

The trough 4 is preferably semi-circular in form and is provided with an outlet 13 to guide the milk into a suitable receptacle.

The numeral 14 designates a base upon which the lower portion of the cone 1 is to be soldered or otherwise fastened, to support the same.

In operation, the cooling liquid will be fed through the pipe 2 from any suitable source and will flow, as indicated by the arrows, between the inner and outer walls 5 and 6 of the cone 1 thus chilling the walls. The milk will be fed slowly through the pipe 3 and thence through the distributer 12 in the neck 11 of the spigot 9, thus distributing the milk evenly over the chilled outer surface of the cone 1. By the time the milk reaches the trough 4 at the bottom of the cone it will be thoroughly chilled and allowed to pass through the outlet 13 of the trough, into suitable containers and will be ready for purposes of shipment, etc.

It is to be understood that the form of my invention herein described and shown is to be taken as a preferred example of the same and that various changes in shape, size and arrangement of parts may be resorted to without departing from the spirit of the invention or scope of the subjoined claim.

Having thus described my invention, what I claim is:

A distributer to be fitted in the depending neck of a spigot comprising a plurality of radially extending blades connected together at their inner edges, the lower edges of the blades being inclined inwardly and upward from their outer edges toward their inner edges forming a concavity in the lower end of the distributer which permits it to fit snugly on the apex of a cone-shaped body.

In testimony whereof I have hereunto set my hand.

VERA OCKFEN.